United States Patent [19]

Mutschler et al.

[11] 4,237,529

[45] Dec. 2, 1980

[54] HEADLAMP ADJUSTING DEVICE

[75] Inventors: Erich Mutschler; Hans Prohaska; Adam Weber, all of Bietigheim-Bissingen, Fed. Rep. of Germany

[73] Assignee: ITT Industries, Inc., New York, N.Y.

[21] Appl. No.: 7,559

[22] Filed: Jan. 29, 1979

[30] Foreign Application Priority Data

Jan. 25, 1978 [DE] Fed. Rep. of Germany ....... 2803089

[51] Int. Cl.³ ............................................. F21V 21/26
[52] U.S. Cl. ..................................... 362/272; 362/66
[58] Field of Search .................................. 362/66, 272

[56] References Cited

U.S. PATENT DOCUMENTS 4,027,149 5/1977 Martin .................................. 362/66

Primary Examiner—Stephen J. Lechert, Jr.
Attorney, Agent, or Firm—James B. Raden; Donald J. Lenkszus

[57] ABSTRACT

Apparatus for adjusting the inclination of vehicular headlights includes a push rod assembly coupled to a headlight and to a position adjusting motor. The push rod assembly includes an articulated coupling to a motor driven actuating device to that coasting of the motor after deenergization does not alter the position of the headlight.

9 Claims, 3 Drawing Figures

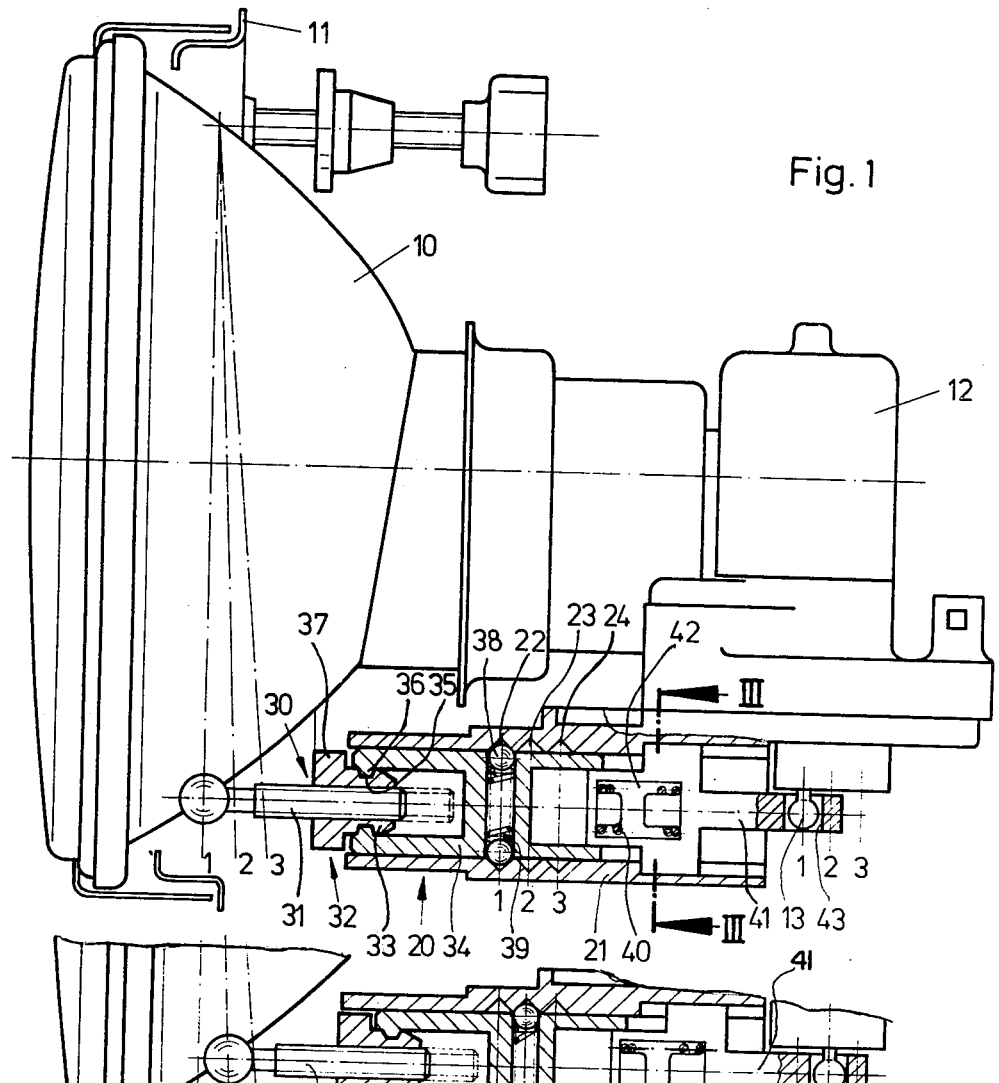
Fig. 1
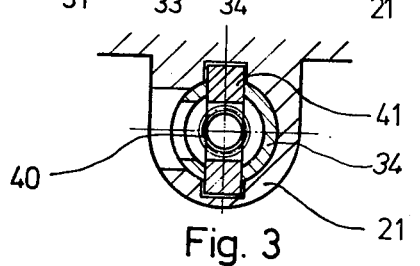
Fig. 2
Fig. 3

HEADLAMP ADJUSTING DEVICE

BACKGROUND OF THE INVENTION

1. Field of the Invention

This invention pertains to a system for adjusting the position of motor vehicle headlamps.

2. Description of the Prior Art

In German OS No. 2,637,326, a headlamp adjusting system is described wherein an electric motor drives an eccentric disk, or an actuating member which co-operates with a push rod coupled to the headlamp. The electric motor is energized via an operating switch and through a switching disk is switched off in several positions. In practice, the position of the eccentric disk cannot be exactly predetermined because after the operating voltage is switched off, the slowing process of the electric motor depends on temperature, load and other factors. Therefore, the headlamp position will also very.

In a manual adjusting device according to the DT-OS No. 2,633,968, a locking of the movable element is provided, however, because of the special design of the locking element, the actuating member is adjusted. Thus, the position of the actuating member cannot vary within a given range of tolerance at a given headlamp position. As a practical matter, this design is not easily adaptable to a motorized system.

SUMMARY OF THE INVENTION

In accordance with the principles of the invention, apparatus for adjusting the inclination of a headlight includes a push rod assembly coupled to the headlight and having an articulated coupling to a motor driven actuating device. The articulated coupling includes a predetermined clearance such that when the headlamp reaches a predetermined position and the motor is deenergized, coasting of the motor does not alter the position of the headlight.

Further in accordance with the invention, the push rod assembly includes an articulated connection to the headlamp.

BRIEF DESCRIPTION OF THE DRAWING

The invention is described below in detail by way of an embodiment shown in the accompanying drawing, in which:

FIG. 1 illustrates in cross-section a headlamp adjusting device in a first locking position;

FIG. 2 illustrates in cross-section the headlamp adjusting device of FIG. 1 in a second locking position; and FIG. 3 is a section taken on the line III—III of FIG. 1.

DETAILED DESCRIPTION OF THE DRAWING

In FIG. 1, a headlamp 10 is movably suspended on a supporting frame 11 in a conventional manner which is not shown in detail. The headlamp 10 can be adjusted by an electric motor 12 via an adjusting member designated generally as 20 into three positions 1, 2 and 3. A cam 13 which is eccentrically fixed on a disk driven by the electric motor via a gear not shown in detail serves as an actuating member.

The adjusting member 20 includes a tube 21 which is fixedly mounted to the vehicle body as a unit with the electric motor 12. The inner wall of the tube 21 is provided with three locking grooves 22, 23 and 24.

A push rod assembly 30 is guided in the tube 21 and may be axially displaced therein. The push rod assembly 30 has a worm-gear spindle 31 which is screwed in an adjustable nut 32 and is articulated to the headlamp 10. The adjustable nut has a shaft 33 extending into a tubular portion 34 of the push rod assembly. In this tubular portion 34, the adjustable nut 32 via an annular groove 35 and a circular web 36 is secured in a manner such that it is protected against twisting. The head 37 of the adjustable nut 32 is edged and has a diameter which is smaller than the inside diameter of the tube 21. In the locking position, as shown in FIG. 2, head 37 of the adjustable nut 32 is completely drawn into the tube 21 so that the adjustable nut 32 can only be rotated in the locking position 1.

On the tubular portion 34, locking elements in the shape of at least one locking ball 38 and a locking spring 39 are secured. The locking balls 38 can spring into the locking grooves 22, 23 or 24.

The tubular portion 34 via a tensioned pressure spring 40 is operatively connected with a tappet push rod 41. The pressure spring 40 is secured in a recess 42 of the tappet push rod 41 and co-operates with stops on the tubular portion 34 which are not shown in detail. Normally the tubular portion 34 and the tappet push rod 41 are connected with each other in a force-locking manner through said spring element acting towards two sides, i.e., the tappet push rod 41 displaces the tubular portion. As soon as the swiveling motion of the headlamp 10 is blocked, a relative motion in both directions between push rod 41 and tubular portion 34 is possible, whereby the pressure spring 40 is loaded. As soon as the blocking is released, the pressure spring 40 presses the tubular portion 34 into the desired locking position. Thus, the force of the pressure spring 40 has to be bigger than the locking force caused by the locking spring 39.

The tappet push rod 41 has an opening 43, the diameter of which is larger than the diameter of the eccentric bolt 13. This is important for obtaining the clearance between push rod 30 and actuating member 13.

The adjusting device operates as follows:

Due to a rotary motion of the motor 12, the eccentric bolt 13 is deviated from position 1 into position 2. Thereby, the eccentric bolt 13 carries along the tappet push rod 41, the tubular portion 34 coupled thereto in a force-locking manner and the spindle 31, and therefore the push rod assembly 30. The locking ball 38 is thereby pressed out of the locking groove 22 and springs into the locking groove 23. Due to the clearance between the push rod 30 and the eccentric bolt 13, the electric motor can slow down in a given range of tolerance. Thus, the electric motor is not braked generally by the locked push rod. Normally, the eccentric bolt 13 will rather slow down into a rest position which is central to the opening 43 which is advantageous during the next adjusting process, wherein the motor at first starts without a load before the eccentric bolt 13 carries along the tappet push rod 41.

The locking device, according to the invention, could also be realized in the initially mentioned type of eccentric disk. However, in this embodiment, the problem can be solved more easily if the eccentric bolt does not have a continuously increasing radius, but a scaled down radius being constant at given angular ranges. Then the electric motor can slow down within this given angular range with constant radius without influencing the adjustment of the headlamp.

Further, embodiments can be imagined in which the locking device acts as a brake for a crank wheel driven by the electic motor.

These and other modifications will be evident to those skilled in the art without departing from the spirit and scope of the invention.

What is claimed is:

1. Apparatus for adjusting the inclination of a motor vehicle headlamp comprising:

a motor;

An actuating member coupled to said motor, said motor being operable to selectively place said actuating member in selected ones of a first plurality of predetermined positions;

a movable push rod coupled to said headlamp;

means for exerting a locking force on said push rod in selected ones of a plurality of second predetermined positions, each of said plurality of second predetermined positions having a correspondence with one of said first plurality of predetermined positions of said actuating member;

an articulated connection between said push rod and said actuating member, said articulated connection comprising first connection means carried by said push rod and second connection means carried by said actuating member and adapted to engage said first connection means, said first and second connection means having a predetermined clearance therebetween.

2. Apparatus in accodance with claim 1, wherein said second connection means comprises an eccentric cam, and said first connection means comprises an opening at one end of said push rod adapted to engage said eccentric cam, said opening having a diameter greater than the width of said eccentric cam.

3. Apparatus in accordance with claim 1, comprising means for locking said headlamp in a selected one of a plurality of predetermined positions.

4. Apparatus in accordance with claim 1, comprising a tubular support member adapted to reciprocatively receive said push rod.

5. Apparatus in accordance with claim 4, wherein said locking means comprises a plurality of concavities on an interior wall of said tube, each of said concavities corresponding to one of said plurality of predetermined positions, and first locking means carried by said push rod for selectively engaging a selected one of said plurality of concavities.

6. Apparatus in accordance with claim 5, wherein said first locking means comprises a spring loaded ball.

7. Apparatus in accordance with claim 4, wherein said push rod comprises:

a tube;

an adjustable nut rotatably secured to said tube in axial alignment therewith;

an adjustable spindle in axial engagement with said nut; and an articulated connection between said spindle and said headlamp.

8. Apparatus in accordance with claim 7, wherein said nut includes a first portion extending into said tube and a head portion, said head portion being adapted to extend outside said tubular support member in only one of said plurality of predetermined positions.

9. Apparatus in accordance with claim 7, wherein said push rod further comprises:

a tappet push rod;

an articulated connection between said tappet push rod and said eccentric cam; and a spring adapted to act against said tappet push rod and said tube.

* * * * *